United States Patent [19]

Chizenko et al.

[11] Patent Number: 5,564,730
[45] Date of Patent: Oct. 15, 1996

[54] FOLDED AIR BAG

[75] Inventors: Paul E. Chizenko; Elaine McDaniel, both of Mesa, Ariz.

[73] Assignee: TRW Inc., Lyndhurst, Ohio

[21] Appl. No.: 495,782

[22] Filed: Jun. 27, 1995

[51] Int. Cl.$^6$ ..................................................... B60R 21/16
[52] U.S. Cl. ...................... 280/728.1; 280/743.1
[58] Field of Search ............................ 280/743.1, 728.1, 280/731, 732, 730.1

[56] References Cited

U.S. PATENT DOCUMENTS

| 5,140,799 | 8/1992 | Satoh | 280/743.1 |
| 5,178,407 | 1/1993 | Kelley | 280/728.1 |
| 5,275,435 | 1/1994 | Fischer | 280/743.1 |
| 5,364,126 | 11/1994 | Kuretake et al. | 280/730.1 |

FOREIGN PATENT DOCUMENTS

| 3544704 | 6/1987 | Germany . | |
| 63-212147 | 9/1988 | Japan . | |
| 2-279441 | 11/1990 | Japan | 280/743.1 |
| 4-368251 | 12/1992 | Japan | 280/743.1 |
| 5-254379 | 10/1993 | Japan | 280/743.1 |
| 5-294201 | 11/1993 | Japan | 280/731 |

Primary Examiner—Kevin Hurley
Assistant Examiner—Peter C. English
Attorney, Agent, or Firm—Tarolli, Sundheim, Covell, Tummino & Szabo

[57] ABSTRACT

A vehicle safety apparatus (10) includes an air bag (20) having an axis (100) and a retainer (16) for supporting the air bag on the vehicle. When the air bag (20) is in a first folded condition, first and second parts (110, 120) of the air bag extend outward from a centerline (78) of the retainer (16) along the axis (100) on opposite sides of the retainer. When the air bag (20) is in a second folded condition, the first part (110) of the air bag (20) is folded along spaced apart first fold lines (130–134) to define a plurality of first folded portions (136–140) of the air bag which overlie each other. In the second folded condition, the second part (120) of the air bag (20) is folded along spaced apart second fold lines (150, 152) to define a plurality of second folded portions (154, 156) which overlie each other. An outermost first folded portion (136) is disposed closer to the vehicle occupant than any other of the first folded portions when the air bag (20) is mounted in the vehicle. First and second outermost second folded portions (154, 156) are disposed closer to the vehicle occupant than any other of the second folded portions when the air bag is mounted in the vehicle. The first and second outermost second folded portions (154, 156) overlie the outermost first folded portion (136).

8 Claims, 3 Drawing Sheets

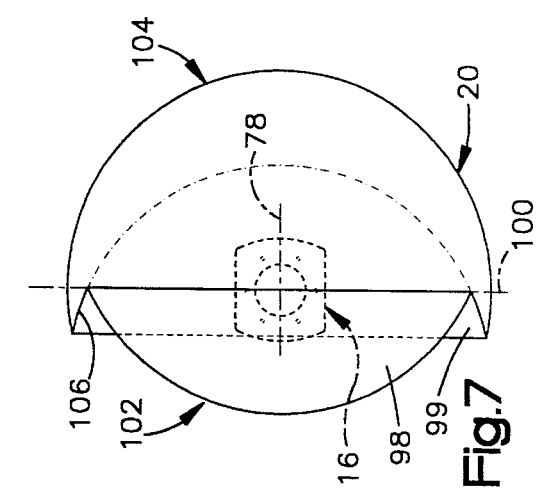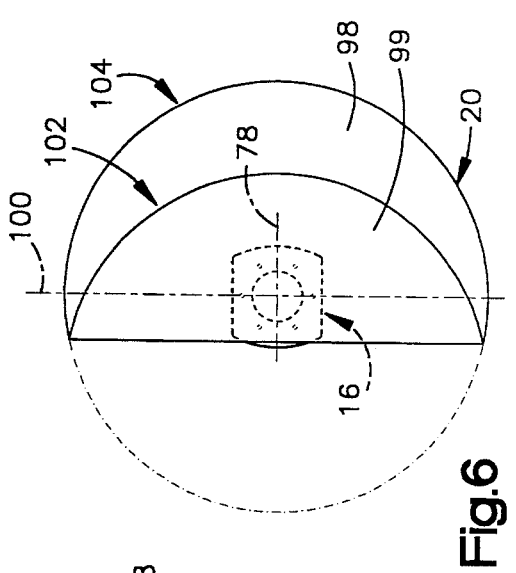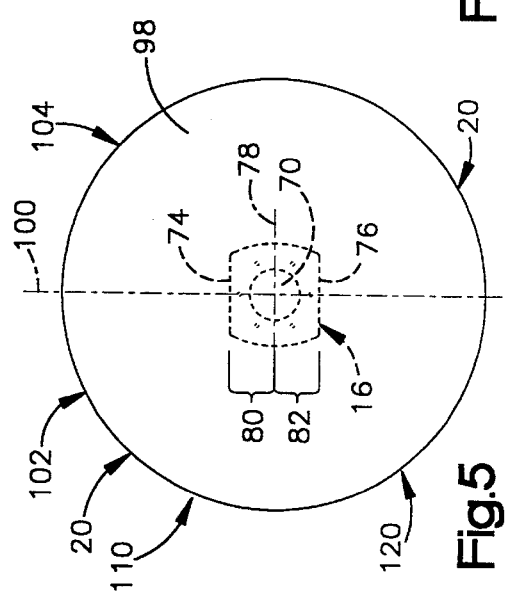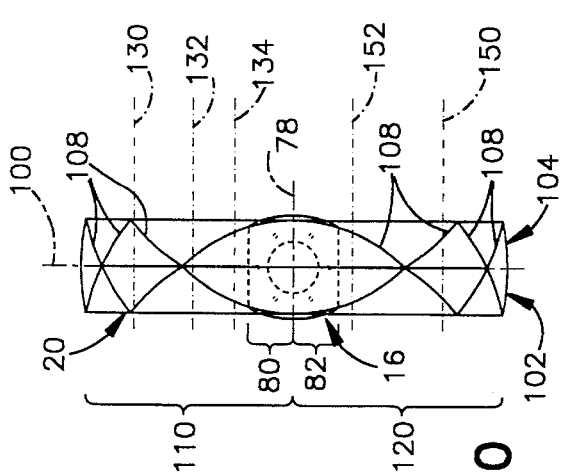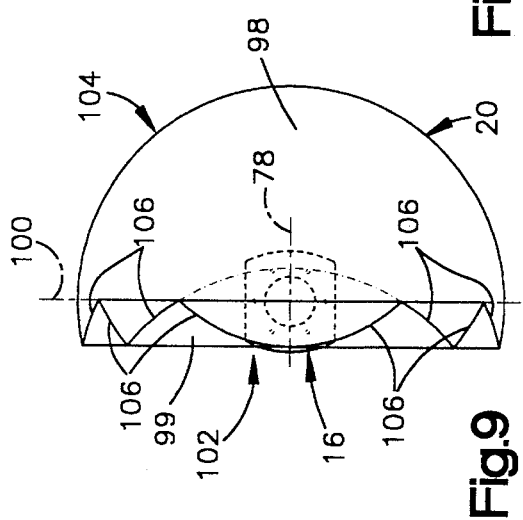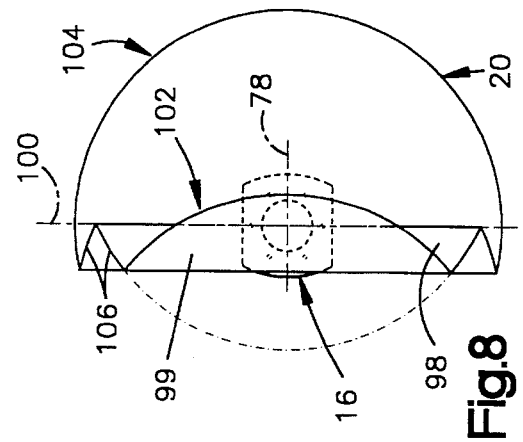

FOLDED AIR BAG

BACKGROUND OF THE INVENTION

1. Technical Field

The present invention relates to an inflatable vehicle occupant restraint, such as an air bag, for protecting a vehicle occupant. In particular, the present invention relates to an air bag module including an air bag which is folded in a predetermined manner.

2. Description of the Prior Art

An air bag for protecting an occupant of a vehicle is typically folded and supported in the instrument panel or steering wheel of the vehicle. In the event of a vehicle emergency situation which requires protection of the vehicle occupant, such as sudden vehicle deceleration, an inflator associated with the air bag is actuated to direct inflation fluid under pressure into the air bag. The air bag inflates to help protect the vehicle occupant.

SUMMARY OF THE INVENTION

The present invention is a vehicle safety apparatus for protecting an occupant of a vehicle. The vehicle safety apparatus includes an inflatable vehicle occupant restraint for, when inflated, protecting the vehicle occupant. The inflatable restraint has a deflated, folded condition and an inflated, unfolded condition. The inflatable restraint has an axis. The vehicle safety apparatus also includes a retainer connected with the inflatable restraint for supporting the inflatable restraint on the vehicle. The inflatable restraint has a first folded condition in which the inflatable restraint is not substantially wider than the retainer. The inflatable restraint when in the first folded condition has first and second parts which extend outward from the retainer along the axis on opposite sides of the retainer.

The inflatable restraint has a second folded condition in which the first part of the inflatable restraint is folded along spaced apart first fold lines extending transverse to the axis. The first fold lines define a plurality of first folded portions of the inflatable restraint which overlie each other. The second part of the inflatable restraint is folded along spaced apart second fold lines extending transverse to the axis. The second fold lines define a plurality of second folded portions of the inflatable restraint which overlie each other.

The first folded portions of the inflatable restraint include an outermost one of the first folded portions which is disposed closer to the vehicle occupant than any other of the first folded portions when the inflatable restraint is mounted in the vehicle. The second folded portions of the inflatable restraint include first and second outermost ones of the second folded portions which are disposed closer to the vehicle occupant than any other of the second folded portions when the inflatable restraint is mounted in the vehicle. The first and second outermost ones of the second folded portions overlie the outermost one of the first folded portions.

BRIEF DESCRIPTION OF THE DRAWINGS

The foregoing and other features of the present invention will become apparent to those skilled in the art to which the present invention relates upon reading the following description of preferred embodiments of the invention together with the accompanying drawings, in which:

FIGS. 5–10 are a series of view illustrating initial steps in the folding of the air bags of FIGS. 1–4.

DESCRIPTION OF PREFERRED EMBODIMENTS OF THE INVENTION

Figure 1:
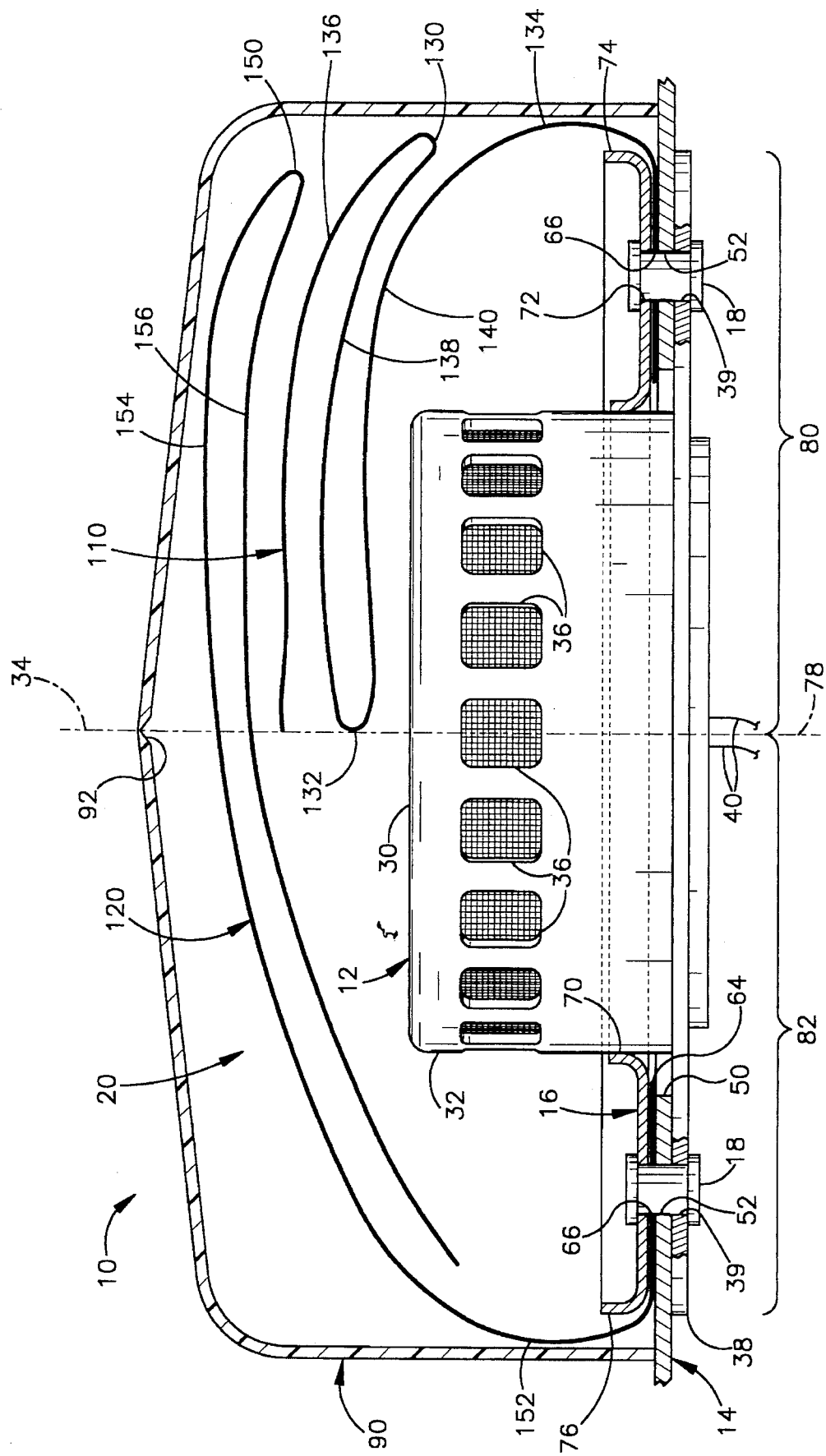
FIG. 1 is a schematic view partially in section of an air bag module including an air bag which is folded in accordance with the present invention.

The present invention relates to a vehicle safety apparatus and, in particular, to an apparatus for protecting an occupant of a vehicle by deployment of an inflatable vehicle occupant restraint in the event of a vehicle emergency situation. The present invention is applicable to various vehicle safety apparatus constructions. As representative of the present invention, FIG. 1 illustrates a vehicle safety apparatus or air bag module 10. The air bag module 10 includes an inflator 12, a mounting plate 14, a retainer 16, an air bag 20, and a cover 90.

The inflator 12 is illustrated as a driver's side inflator and comprises a source of inflation fluid for inflating the air bag 20. As known in the art, the inflator 12 may contain an ignitable gas generating material which, when ignited, rapidly generates a large volume of gas. The inflator 12 may alternatively contain a stored quantity of pressurized inflation fluid, or a combination of pressurized inflation fluid and ignitable material for heating the inflation fluid.

The inflator 12 includes a body portion 30 having a cylindrical outer side surface 32 which extends parallel to a central axis 34 of the inflator. A plurality of gas outlet openings 36 are formed in the body portion 30 of the inflator 12 for directing inflation fluid into the air bag 20. A mounting flange 38 projects radially outward from a lower (as viewed in FIG. 1) end of the body portion 30 of the inflator 12. A plurality of fastener openings 39, two of which are visible in FIG. 1, are formed in the mounting flange 38 of the inflator 12. A pair of lead wires 40 extend from the inflator 12 and are connected to vehicle circuitry (not shown) to receive an electric signal to actuate the inflator, in a known manner.

The mounting plate 14 is a member which secures the inflator 12, the air bag 20, and the retainer 16 to a portion of the vehicle (not shown) such as the vehicle steering wheel assembly. The mounting plate 14 is a metal plate. It should be understood that a mounting plate can have different configurations. For example, in a vehicle safety apparatus including a passenger side air bag, the mounting plate could be a portion of a housing of an air bag module, a portion of an inflator, or a portion of a vehicle instrument panel.

The mounting plate 14 has a circular central opening 50 for receiving the body portion of the inflator 12. The mounting plate 14 also includes a plurality of fastener openings 52, two of which are visible in FIG. 1. The fastener openings 52 are spaced apart in a circular array centered on the axis 34.

The air bag 20 (illustrated schematically in FIG. 1) is made from two panels of a fabric material, such as woven nylon. The material of the air bag 20 is, for clarity, illustrated in FIG. 1 with a single line rather than in section. In addition, certain portions of the air bag 20, which would illustrate the double-panelled configuration of the air bag, are for clarity not shown in FIG. 1.

The air bag 20 is folded and stored adjacent to the inflator 12, in a manner described below. The air bag 20 defines an inflation fluid volume for receiving inflation fluid from the inflator 12 to move the air bag from the folded and stored condition to the inflated condition. When the air bag 20 is inflated, the exterior surface of the air bag is engageable by a vehicle occupant to protect the vehicle occupant.

The body portion 30 of the inflator 12 extends through a central opening 64 in the air bag 20. The air bag 20 also includes a plurality of fastener openings 66, two of which are visible in FIG. 1. The fastener openings 66 are spaced apart in a circular array centered on the axis 34. The fastener openings 66 in the air bag 20 overlie the fastener openings 52 in the mounting plate 14 and the fastener openings 39 in the inflator mounting flange 38.

The retainer 16 (FIGS. 1 and 5) is generally rectangular in shape and circumscribes the inflator 12. The retainer 16 is made from metal and has a U-shaped cross-sectional configuration. The body portion 30 of the inflator 12 extends through a central opening 70 of the retainer 16. A plurality of fastener openings 72 extend axially through the retainer 16. The openings 72 are spaced apart in a circular array centered on the axis 34. The openings 72 overlie the fastener openings 66 in the air bag 20 and the fastener openings 52 in the mounting plate 14.

The retainer 16 has a first side portion 74 (FIGS. 1 and 5) and an opposite second side portion 76. The first and second side portions 74 and 76 of the retainer 16 extend generally parallel to a central plane or centerline 78 (FIGS. 5–10) of the retainer 16. The centerline 78 is shown in FIGS. 1–4 as a dashed line extending vertically through the retainer 16 co-extensive with the inflator axis 34. The centerline 78 defines a first portion 80 of the retainer 16 which extends between the first side portion 74 of the retainer and the centerline. A second portion 82 of the retainer 16 extends between the second side portion 76 of the retainer and the centerline 78.

The fasteners 18, which are illustrated as being rivets, extend axially through the aligned openings 72, 66, 52, and 39 in the retainer 16, the air bag 20, the mounting plate 14 and the inflator 12, respectively. The fasteners 18 clamp the air bag 20 between the retainer 16 and the mounting plate 14. The inflator 12 is also held in position against the mounting plate 14 on a side of the mounting plate opposite the air bag 20 and the retainer 16. It should be understood that other types of fasteners such as bolts, studs, or screws could be used instead of the rivets 18.

The air bag module 10 also includes a plastic cover 90 which is secured to the mounting plate 14 in a manner not shown. The cover 90 is disposed closest to the vehicle occupant when the air bag module 10 is mounted in the vehicle. Thus, the air bag 20 inflates generally in an upward direction as viewed in FIG. 1. The cover 90 has a breakable portion 92 at which the cover is designed to break open upon inflation of the air bag 20.

The air bag 20 (FIGS. 5–10) is initially in a deflated, unfolded condition as shown in FIG. 5 and is associated with the retainer 16. The air bag includes a circular front panel 98 (FIGS. 5–9) and a circular back panel 99 (FIGS. 6–9) underlying the front panel. The back panel 99 includes the inflator opening 64 (FIG. 1) but is otherwise identical to the front panel 98.

The air bag 20 has a generally circular configuration as viewed in FIG. 5. A top-to-bottom axis 100 of the air bag 20 is a diametral axis that extends transverse to the first side portion 74 of the retainer 16 and the opposite second side portion 76 of the retainer. The top-to-bottom axis 100 also extends transverse to the centerline 78 of the retainer 16. A first side portion 102 of the air bag 20 is disposed to the left of the axis 100 as viewed in FIG. 5. A second side portion 104 of the air bag 20 is disposed to the right of the axis 100 as viewed in FIG. 5.

FIGS. 5–10 illustrate the initial steps in the process of folding the air bag 20. The first side portion 102 of the air bag 20 is folded inwardly, in a manner as shown sequentially in FIGS. 6–9, toward the axis 100 to form a plurality of pleat folds 106 on the one side of the axis. The second side portion 104 (FIG. 10) of the air bag 20 is also folded inwardly in a similar manner toward the axis 100, to form a plurality of pleat folds 108 on the opposite side of the axis from the first side portion 102.

The air bag 20 is thus in a first folded condition as shown in FIG. 10. A first part 110 of the air bag 20 is disposed above (as viewed in FIG. 10) the centerline 78 of the retainer 16. A second part 120 of the air bag 20 is disposed below (as viewed in FIG. 10) the centerline 78 of the retainer 16. The first and second parts 110 and 120 of the air bag 20 extend outward from the retainer 16 along the axis 100 of the air bag 20 on opposite sides of the retainer. The air bag 20 as thus folded is not significantly wider (from left to right as viewed in FIG. 10) than the retainer 16.

The air bag 20 is next folded top-to-bottom to a second folded condition illustrated schematically in FIG. 1. The first part 110 of the air bag 20 is pleat folded along spaced apart first fold lines 130, 132 and 134 (FIGS. 1 and 10) extending transverse to the axis 100. The first fold lines 130, 132 and 134 define a plurality or stack of first folded portions 136, 138 and 140 (FIG. 1) of the air bag 20 which overlie each other. The stack of first folded portions 136, 138 and 140 overlies the first portion 80 of the retainer 16.

The first folded portions 136, 138 and 140 of the air bag 20 extend from the first side portion 74 of the retainer 16 in a direction toward the second side portion 76 of the retainer 16. The first folded portions 136, 138, and 140 of the air bag 12 do not extend past (to the left as viewed in FIG. 1) the centerline 78 of the retainer 16 by a significant distance. An outermost one 136 of the first folded portions 136, 138 and 140 is disposed closer to the vehicle occupant than any other of the first folded portions when the air bag 20 is mounted in the vehicle.

The second part 120 of the air bag 20 is folded along spaced apart second fold lines 150 and 152 (FIGS. 1 and 10) extending transverse to the axis 100. The second fold lines 150 and 152 define a plurality or stack of second folded portions 154 and 156 (FIG. 1) of the air bag 20 which overlie each other.

The second folded portions 154 and 156 of the air bag 20 extend from the second side portion 76 of the retainer 16 past the centerline 78 to a position overlying the first side portion 74 of the retainer 16. Thus, the stack of second folded portions 154 and 156 of the air bag 20 overlies the first portion 80 of the retainer 16 as well as the second portion 82 of the retainer. First and second outermost ones 154 and 156 of the second folded portions are disposed closer to the vehicle occupant than any other of the second folded portions when the air bag 20 is mounted in the vehicle. (It should be understood that more than two second folded portions of the air bag 20 can be provided.) The outermost second folded portions 154 and 156 overlie the outermost one 136 of the first folded portions 136, 138 and 140. The second folded portions 154 and 156 of the air bag 20, as well as the first folded portions 136, 138 and 140 of the air bag, are enclosed by the cover 90 when the air bag module 10 is mounted in the vehicle.

In the event of vehicle deceleration exceeding a predetermined deceleration, the inflator 12 is actuated in a known manner to direct inflation fluid into the deflated, folded air bag 20. The air bag 20 unfolds and inflates. As the air bag 20 unfolds and inflates, it moves in an upward direction as viewed in FIG. 1, toward the vehicle occupant.

The inflating air bag 20 contacts the cover 90. As the force of the inflating air bag 20 increases, the cover 90 breaks at the breakable portion 92. The cover 90 opens outwardly and upwardly until the air bag 20 inflates completely. The inflated air bag 20 restrains movement of the vehicle occupant.

Figure 2:
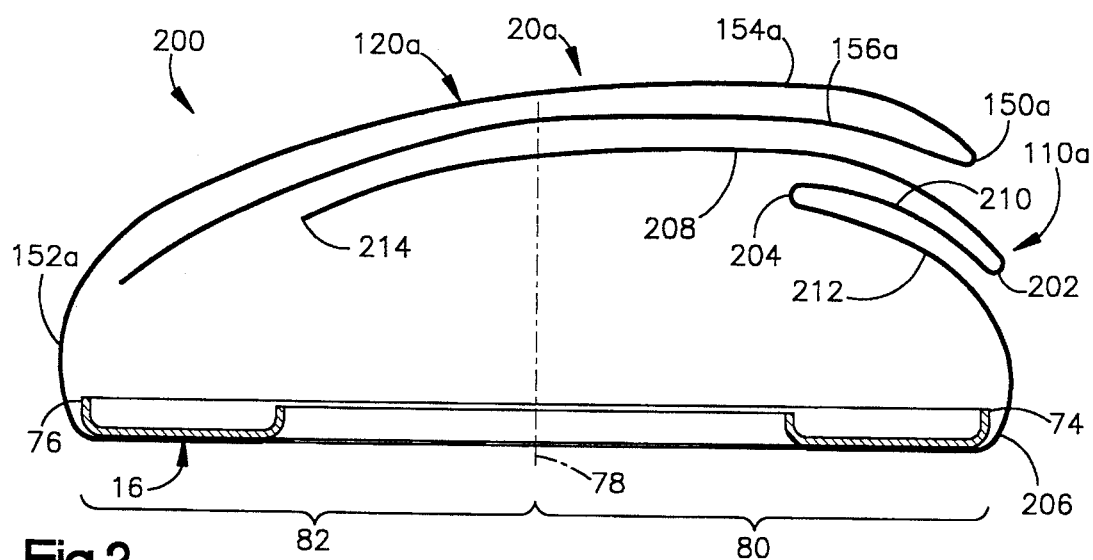
FIG. 2 is a view similar to FIG. 1 of an air bag module including an air bag which is folded in accordance with a second embodiment of the present invention.

FIG. 2 illustrates parts of an air bag module 200 including an air bag 20a which is folded in accordance with a second embodiment of the present invention. For clarity, only the air bag 20a and the retainer 16 are shown. The parts of the module 200 other than the air bag 20a are the same as the corresponding parts of the air bag module 10 illustrated in FIG. 10 The air bag 20a is inflatable in a manner similar to the air bag 20 to protect a vehicle occupant.

The air bag 20a is first folded in the manner shown in FIGS. 5–10 to a first folded condition. When the air bag 20a is in the first folded condition (not shown in FIG. 2), a first part 110a of the air bag is disposed on one side of the retainer 16 and a second part 120a of the air bag is disposed on the other side of the retainer.

The air bag 20a is next folded into a second folded condition illustrated schematically in FIG. 2. The first part 110a of the air bag 20a when in the second folded condition is pleat folded along a plurality of first fold lines 202, 204 and 206 to form a stack of first folded portions 208, 210 and 212 of the air bag. The outermost one 208 of the first folded portions 208, 210 and 212 extends from the first side portion 74 of the retainer 16 past the centerline 78 of the retainer. The first folded portion 208 overlies the first portion 80 of the retainer as well as a substantial part of the second portion 82 of the retainer. The end 214 of the outermost first folded portion 208 is disposed between the centerline 78 of the retainer 16 and the second side portion 76 of the retainer. The remaining ones 210 and 212 of the first folded portions 208, 210 and 212 overlie only the first portion 80 of the retainer 16.

The second part 120a of the air bag 20a is folded in the same manner as the second part 120 of the air bag 20 (FIG. 1). Specifically, the second part 120a of the air bag 20a is folded along spaced apart second fold lines 150a and 152a to define a plurality or stack of second folded portions 154a and 156a of the air bag which overlie each other. The second folded portions 154a and 156a of the air bag 20a extend from the second side portion 76 of the retainer 16 past the centerline 78 to a position overlying the first side portion 74 of the retainer 16.

The stack of second folded portions 154a and 156a overlies the first portion 80 of the retainer 16 as well as the second portion 82 of the retainer 16. First and second outermost ones 154a and 156a of the second folded portions are disposed closer to the vehicle occupant than any other of the second folded portions when the air bag 20a is mounted in the vehicle. (It should be understood that more than two second folded portions of the air bag 20a can be provided.)

The outermost second folded portions 154a and 156a of the air bag 20a overlie the outermost first folded portion 208 of the air bag 20a.

Figure 3:
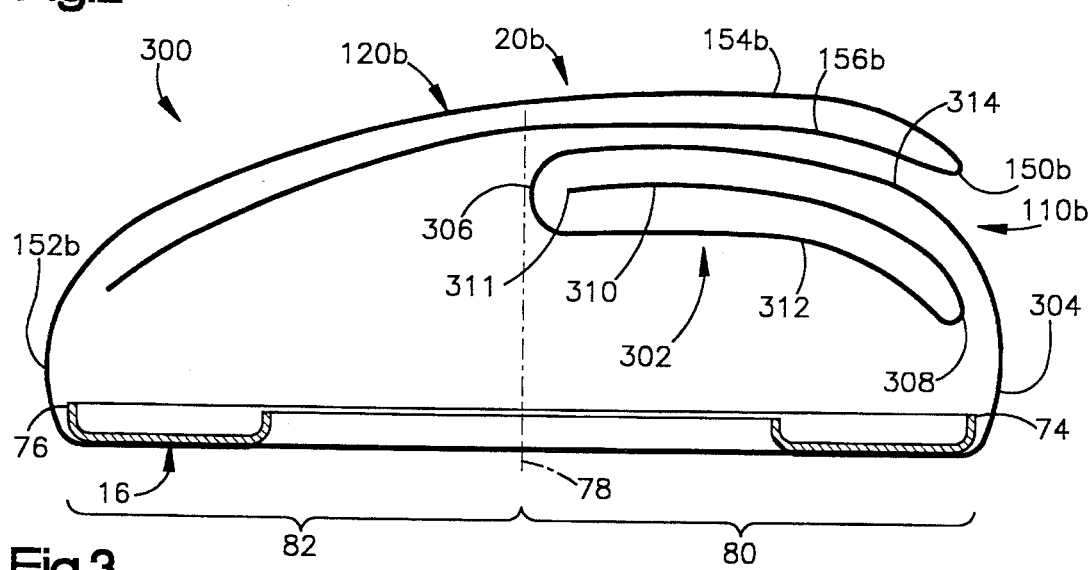
FIG. 3 is a view similar to FIG. 1 of an air bag module including an air bag which is folded in accordance with a third embodiment of the present invention.

FIG. 3 illustrates parts of an air bag module 300 including an air bag 20b which is folded in accordance with a third embodiment of the present invention. For clarity, only the air bag 20b and the retainer 16 are shown. The parts of the module 300 other than the air bag 20b are the same as the corresponding parts of the air bag module 10 illustrated in FIG. 1. The air bag 20b is inflatable in a manner similar to the air bag 20 to protect a vehicle occupant.

The air bag 20b is first folded in the manner shown in FIGS. 5–10 to a first folded condition. When the air bag 20b is in the first folded condition (not shown in FIG. 3), a first part 110b of the air bag is disposed on one side of the retainer 16 and a second part 120b of the air bag is disposed on the other side of the retainer.

The air bag 20b is next folded into a second folded condition illustrated schematically in FIG. 3. The first part 110b of the air bag 20b when in the second folded condition is rolled up to form a roll 302 which is disposed over the first portion 80 of the retainer 16. The roll 302 is flattened along a plurality of first fold lines 304, 306 and 308 to form a series of first folded portions 310, 312 and 314 of the air bag 20b. The first folded portions 310, 312 and 314 extend from the first side portion 74 of the retainer 16 and overlie the first portion 80 of the retainer.

The first folded portion 310 of the air bag 20b includes an end portion 311 of the first part 110b of the air bag which is spaced apart farthest from the retainer 16 when the air bag is in the first folded condition. The first folded portion 310 is disposed intermediate the other first folded portions 312 and 314. The first folded portion 314 of the air bag 20b is disposed closer to the vehicle occupant than any other of the first folded portions when the air bag 20b is mounted in the vehicle.

The second part 120b of the air bag 20b is folded in the same manner as the second part 120 of the air bag 20 (FIG. 1). Specifically, the second part 120b of the air bag 20b is folded along spaced apart second fold lines 150b and 152b to define a plurality or stack of second folded portions 154b and 156b of the air bag which overlie each other. The second folded portions 154b and 156b of the air bag 20b extend from the second side portion 76 of the retainer 16 to a position overlying the first side portion 74 of the retainer 16.

The stack of second folded portions 154b and 156b overlies the first portion 80 of the retainer 16 as well as the second portion 82 of the retainer 16. First and second outermost ones 154b and 156b of the second folded portions are disposed closer to the vehicle occupant than any other of the second folded portions when the air bag 20b is mounted in the vehicle. (It should be understood that more than two second folded portions of the air bag 20b can be provided.) The first and second outermost ones 154b and 156b of the second folded portions of the air bag 20b overlie the outermost one 314 of the first folded portions 310, 312 and 314 of the air bag 20b.

Figure 4:
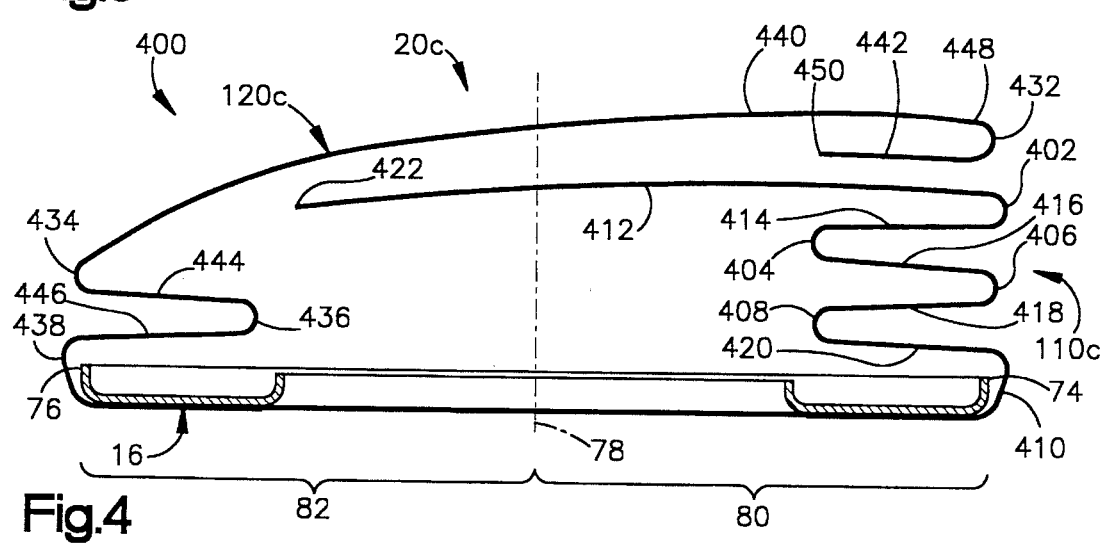
FIG. 4 is a view similar to FIG. 1 of an air bag module including an air bag which is folded in accordance with a fourth embodiment of the present invention.

FIG. 4 illustrates parts of an air bag module 400 including an air bag 20c which is folded in accordance with a fourth embodiment of the present invention. For clarity, only the air bag 20c and the retainer 16 are shown. The parts of the module 400 other than the air bag 20c are the same as the corresponding parts of the air bag module 10 illustrated in FIG. 1. The air bag 20c is inflated in a manner similar to the air bag 20 to protect a vehicle occupant.

The air bag 20c is first folded in the manner shown in FIGS. 5–10 to a first folded condition. When the air bag 20c is in the first folded condition (not shown in FIG. 4), a first part 110c of the air bag is disposed on one side of the retainer 16 and a second part 120c of the air bag is disposed on the other side of the retainer.

The air bag 20c is next folded into a second folded condition illustrated schematically in FIG. 2. The first part 110c of the air bag 20c when in the second folded condition is folded along a plurality of first fold lines 402, 404, 406, 408 and 410 to form a stack of first folded portions 412, 414, 416, 418 and 420 of the air bag. The first folded portions 412–420 of the air bag 20c extend from the first side portion 74 of the retainer 16 in a direction toward the second side portion 76 of the retainer 16. The outermost one 412 of the first folded portions 412–420 of the air bag 20c extends from the first side portion 74 of the retainer 16 past the centerline 78 of the retainer. The first folded portion 412 overlies the first portion 80 of the retainer as well as a substantial part of the second portion 82 of the retainer. An end portion 422 of the outermost first folded portion 412 is disposed between the centerline 78 of the retainer 16 and the second side portion 76 of the retainer. The remaining ones 414–420 of the first folded portions 412–420 in the stack overlie only the first portion 80 of the retainer 16.

The second part 120c of the air bag 20c when in the second folded condition is folded along a plurality of second fold lines 432, 434, 436, and 438 to form a stack of second folded portions 440, 442, 444 and 446 of the air bag. The first outermost one 440 of the second folded portions 440–446 of the air bag 20c extends from the second side portion 76 of the retainer 16 to a location overlying the first side portion 74 of the retainer 16. The first outermost one 440 of the second folded portions 440–446 overlies the second portion 82 of the retainer as well as a part of the first portion 80 of the retainer. The first outermost one of the second folded portions 440–446 has an outer edge portion 448 which overlies the first side portion 74 of the retainer 16.

The second outermost one 442 of the second folded portions 440–446 is folded under the outer edge portion 448 of the first outermost one 440 of the second folded portions 440–446, in a position adjacent to and overlying the first folded portion 412. The second outermost one 442 of the second folded portions 440–446 of the air bag 20c extends from the outer edge portion 448 of the first outermost second folded portion 440 in a direction toward the second side portion 76 of the retainer 160 The end 450 of the second folded portion 442 is disposed approximately over the first fold lines 404 and 408, at a location near to the first side portion 74 of the retainer 16 and over the first portion 80 of the retainer. The second outermost one 442 of the second folded portions 440–446 of the air bag 20 overlies only the first portion 80 of the retainer 16.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle safety apparatus for protecting an occupant of a vehicle comprising:

an inflatable vehicle occupant restraint for, when inflated, protecting the vehicle occupant, said inflatable restraint having a deflated, folded condition and an inflated, unfolded condition, said inflatable restraint having an axis; and a retainer connected with said inflatable restraint for supporting said inflatable restraint on the vehicle;

said retainer having opposite first and second side portions and a centerline which extends transverse to said axis, said centerline defining a first portion of said retainer extending between said centerline and said first side portion of said retainer and a second portion of said retainer extending between said centerline and said second side portion of said retainer;

said inflatable restraint having a first folded condition in which said inflatable restraint is not substantially wider than said retainer, said inflatable restraint when in the first folded condition having first and second parts which extend outward from said retainer along said axis on opposite sides of said retainer;

said inflatable restraint having a second folded condition for mounting in the vehicle in which said first part of said inflatable restraint is folded along spaced apart first fold lines extending transverse to said axis, said first fold lines defining a plurality of first folded portions of said inflatable restraint which overlie each other and which are disposed entirely over said first portion of said retainer;

said first folded portions including an outermost one of said first folded portions which is disposed closer to the vehicle occupant than any other of said first folded portions when said inflatable restraint is mounted in the vehicle;

said second part of said inflatable restraint being folded along spaced apart second fold lines extending transverse to said axis, said second fold lines defining a plurality of second folded portions of said inflatable restraint which overlie each other;

said second folded portions including first and second outermost ones of said second folded portions which are disposed closer to the vehicle occupant than any other of said second folded portions when said inflatable restraint is mounted in the vehicle;

said first and second outermost ones of said second folded portions overlying said outermost one of said first folded portions;

at least said first outermost one of said second folded portions of said inflatable restraint extending from said second side portion of said retainer to a location overlying said first side portion of said retainer.

2. A vehicle safety apparatus as set forth in claim 1 wherein each one of said second folded portions of said inflatable restraint overlies at least a portion of said first portion of said retainer.

3. A vehicle safety apparatus as set forth in claim 1 wherein at least one of said first fold lines in said first part of said inflatable restraint is disposed approximately over said centerline of said retainer.

4. A vehicle safety apparatus for protecting an occupant of a vehicle comprising:

an inflatable vehicle occupant restraint for, when inflated, protecting the vehicle occupant, said inflatable restraint having a deflated, folded condition and an inflated, unfolded condition, said inflatable restraint having an axis; and a retainer connected with said inflatable restraint for supporting said inflatable restraint on the vehicle;

said inflatable restraint having a first folded condition in which said inflatable restraint is not substantially wider than said retainer, said inflatable restraint when in the first folded condition having first and second parts which extend outward from said retainer along said axis on opposite sides of said retainer;

said inflatable restraint having a second folded condition for mounting in the vehicle in which said first part of said inflatable restraint is folded along spaced apart first fold lines extending transverse to said axis, said first fold lines defining a plurality of first folded portions of said inflatable restraint which overlie each other;

said second part of said inflatable restraint being folded along spaced apart second fold lines extending transverse to said axis, said second fold lines defining a plurality of second folded portions of said inflatable restraint which overlie each other;

said first folded portions including an outermost one of said first folded portions which is disposed closer to the vehicle occupant than any other of said first folded portions when said inflatable restraint is mounted in the vehicle;

said second folded portions including first and second outermost ones of said second folded portions which are disposed closer to the vehicle occupant than any other of said second folded portions when said inflatable restraint is mounted in the vehicle;

said first and second outermost ones of said second folded portions overlying said outermost one of said first folded portions;

said retainer having opposite first and second side portions, said first folded portions of said inflatable restraint extending from said first side portion of said retainer in a direction toward said second side portion of said retainer, at least said first outermost one of said second folded portions of said inflatable restraint extending from said second side portion of said retainer to a location overlying said first side portion of said retainer;

said retainer having a centerline which extends transverse to said axis, said centerline defining a first portion of said retainer extending between said centerline and said first side portion of said retainer and a second portion of said retainer extending between said centerline and said second side portion of said retainer;

said first part of said inflatable restraint when in the second folded condition being pleat folded along said first fold lines to form a stack of said first folded portions of said inflatable restraint, an outermost one of said first folded portions extending from said first side portion of said retainer past said centerline and overlying at least a substantial part of said second portion of said retainer, the remaining ones of said first folded portions in said stack overlying only said first portion of said retainer.

5. A vehicle safety apparatus for protecting an occupant of a vehicle comprising:

an inflatable vehicle occupant restraint for, when inflated, protecting the vehicle occupant, said inflatable restraint having a deflated, folded condition and an inflated, unfolded condition, said inflatable restraint having an axis; and a retainer connected with said inflatable restraint for supporting said inflatable restraint on the vehicle;

said inflatable restraint having a first folded condition in which said inflatable restraint is not substantially wider than said retainer, said inflatable restraint when in the first folded condition having first and second parts which extend outward from said retainer along said axis on opposite sides of said retainer;

said inflatable restraint having a second folded condition for mounting in the vehicle in which said first part of said inflatable restraint is folded along spaced apart first fold lines extending transverse to said axis, said first fold lines defining a plurality of first folded portions of said inflatable restraint which overlie each other;

said second part of said inflatable restraint being folded along spaced apart second fold lines extending transverse to said axis, said second fold lines defining a plurality of second folded portions of said inflatable restraint which overlie each other;

said first folded portions including an outermost one of said first folded portions which is disposed closer to the vehicle occupant than any other of said first folded portions when said inflatable restraint is mounted in the vehicle;

said second folded portions including first and second outermost ones of said second folded portions which are disposed closer to the vehicle occupant than any other of said second folded portions when said inflatable restraint is mounted in the vehicle;

said first and second outermost ones of said second folded portions overlying said outermost one of said first folded portions;

said retainer having opposite first and second side portions, said first folded portions of said inflatable restraint extending from said first side portion of said retainer in a direction toward said second side portion of said retainer, at least said first outermost one of said second folded portions of said inflatable restraint extending from said second side portion of said retainer to a location overlying said first side portion of said retainer;

said retainer having a centerline which extends transverse to said axis, said centerline defining a first portion of said retainer extending between said centerline and said first side portion of said retainer and a second portion of said retainer extending between said centerline and said second side portion of said retainer;

said first part of said inflatable restraint when in the second folded condition being rolled up to form a roll which is disposed over said first portion of said retainer, said roll being flattened along said first fold lines to form said first folded portions of said inflatable restraint.

6. A vehicle occupant safety apparatus as set forth in claim 5 wherein one of said first folded portions of said inflatable restraint includes an end portion of said first part of said inflatable restraint which, when said inflatable restraint is in the first folded condition, is spaced apart farthest from said retainer, said one first folded portion being folded between others of said first folded portions when said inflatable restraint is in the second folded condition.

7. A vehicle safety apparatus for protecting an occupant of a vehicle comprising:

an inflatable vehicle occupant restraint for, when inflated, protecting the vehicle occupant, said inflatable restraint having a deflated, folded condition and an inflated, unfolded condition, said inflatable restraint having an axis; and a retainer connected with said inflatable restraint for supporting said inflatable restraint on the vehicle;

said inflatable restraint having a first folded condition in which said inflatable restraint is not substantially wider than said retainer, said inflatable restraint when in the first folded condition having first and second parts which extend outward from said retainer along said axis on opposite sides of said retainer;

said inflatable restraint having a second folded condition for mounting in the vehicle in which said first part of said inflatable restraint is folded along spaced apart first fold lines extending transverse to said axis, said first fold lines defining a plurality of first folded portions of said inflatable restraint which overlie each other;

said second part of said inflatable restraint being folded along spaced apart second fold lines extending transverse to said axis, said second fold lines defining a plurality of second folded portions of said inflatable restraint which overlie each other;

said first folded portions including an outermost one of said first folded portions which is disposed closer to the vehicle occupant than any other of said first folded portions when said inflatable restraint is mounted in the vehicle;

said second folded portions including first and second outermost ones of said second folded portions which are disposed closer to the vehicle occupant than any other of said second folded portions when said inflatable restraint is mounted in the vehicle;

said first and second outermost ones of said second folded portions overlying said outermost one of said first folded portions;

said retainer having opposite first and second side portions and a centerline which extends transverse to said axis, said centerline defining a first portion of said retainer extending between said centerline and said first side portion of said retainer and a second portion of said retainer extending between said centerline and said second side portion of said retainer;

said first outermost one of said second folded portions of said inflatable restraint extending from said second side portion of said retainer to said first side portion of said retainer, said first outermost one of said second folded portions having an outer edge portion which overlies said first side portion of said retainer;

said second outermost one of said second folded portions of said inflatable restraint extending from said outer edge portion of said first outermost one of said second folded portions in a direction toward said second side portion of said retainer, said second outermost one of said second folded portions of said inflatable restraint overlying only said first portion of said retainer.

8. A vehicle safety apparatus as set forth in claim 7 wherein said first part of said inflatable restraint when in the second folded condition is pleat folded along said first fold lines to form a stack of said first folded portions of said inflatable restraint, said outermost one of said first folded portions extending from said first side portion of said retainer past said centerline and overlying a substantial part of said second portion of said retainer, the remaining ones of said first folded portions in said stack overlying only said first portion of said retainer.

* * * * *